(12) United States Patent
Bock et al.

(10) Patent No.: US 6,454,209 B1
(45) Date of Patent: Sep. 24, 2002

(54) COMFORT AND ILLUMINATION APPARATUS FOR A PASSENGER SPACE

(75) Inventors: Thomas Bock, Grenade (FR); Andrew Muin, Harsefeld; Markus Schumacher, Buxtehude, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/591,879

(22) Filed: Jun. 12, 2000

(30) Foreign Application Priority Data

Jun. 11, 1999 (DE) .......................... 199 26 776

(51) Int. Cl.⁷ .............................................. B64D 11/00
(52) U.S. Cl. .................... 244/118.5; 362/459; 362/471; 362/478; 105/329.1; 105/314
(58) Field of Search .......................... 244/118.5, 118.6; 362/459, 470, 471, 478; 105/344, 347, 329.1, 314

(56) References Cited

U.S. PATENT DOCUMENTS

| 3,330,506 A | * | 7/1967 | Robillard et al. ........ 244/118.5 |
| 5,707,028 A | * | 1/1998 | Roeper .................... 244/118.5 |
| 5,752,673 A | | 5/1998 | Schliwa et al. .......... 244/118.6 |
| 6,056,239 A | * | 5/2000 | Cantu et al. ............. 244/118.5 |
| 6,092,915 A | * | 7/2000 | Rensch ....................... 362/471 |
| 6,152,400 A | * | 11/2000 | Sankrithi et al. ........ 244/118.5 |
| 6,182,926 B1 | * | 2/2001 | Moore ..................... 244/118.5 |

FOREIGN PATENT DOCUMENTS

| DE | 4416506 | 5/1994 |
| EP | 0408709 | 1/1991 |
| EP | 0606920 | 7/1994 |

* cited by examiner

Primary Examiner—J. Woodrow Eldred
(74) Attorney, Agent, or Firm—W. F. Fasse; W. G. Fasse

(57) ABSTRACT

A comfort and illumination unit especially for a passenger space in an aircraft is constructed for cooperation with a straight wall panel that can be integrated in or secured to a vertical straight wall and/or a horizontal straight ceiling wall. The unit has a mounting base and a cover with passenger convenience elements mounted to the base under the cover which is provided with cut-outs for access to the convenience elements. Fluorescent bulbs form a frame around the convenience elements.

19 Claims, 6 Drawing Sheets

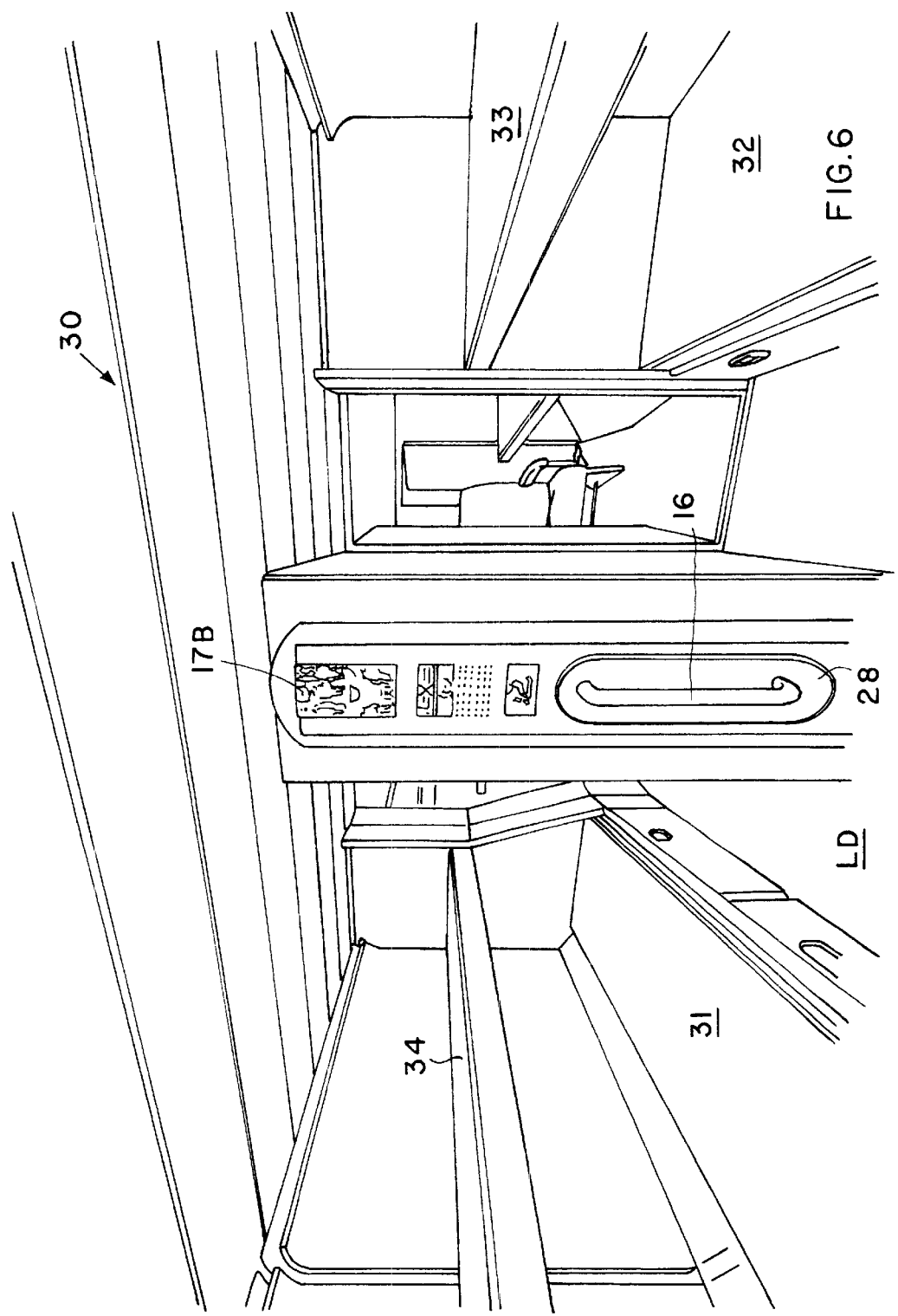

COMFORT AND ILLUMINATION APPARATUS FOR A PASSENGER SPACE

PRIORITY CLAIM

This application is based on and claims the priority under 35 U.S.C. §119 of German Patent Application 199 26 776.6, filed on Jun. 11, 1999, the entire disclosure of which is incorporated herein by reference.

1. Field of the Invention

The invention relates to comfort and illumination devices for a passenger space, particularly in an aircraft. Such devices are equipped with passenger convenience elements and with light emitting devices for illuminating the passenger space.

2. Background Information

It is customary to illuminate a passenger cabin in an aircraft in such a way that the cabin ceiling is at least partially irradiated by light emitting devices to achieve an indirect illumination of the cabin space or passenger space. The light source itself is conventionally a fluorescent tube or tubes which are arranged in the curved cabin ceiling behind ceiling cover panels. The light tubes are normally so positioned that a passenger standing in the cabin, for example in the aisle does not see the light tubes. In order to achieve a satisfactory indirect illumination of the cabin space, however, it is necessary to provide a curved cabin ceiling configuration which is very space consuming. It is desirable to achieve a homogeneously illuminated cabin ceiling construction which radiates diffused light into the cabin, whereby the optimal curvature of the ceiling cabin is ascertained by information to gain empirical information as is, for example disclosed in European Patent Publication EP 408,709 B1.

European Patent Publication EP 606,920 A1, German Patent Publication 44 16 506 A1 and U.S. Pat. No. 5,752,673 (Schliwa et al.) illustrate that an indirect cabin illumination of the type described above cannot be realized in passenger spaces on a lower deck of an aircraft because there is not enough space for the required ceiling curvature. Conventionally, passenger spaces on the lower deck are limited in their floor-to-ceiling clearance, particularly where the passenger spaces are modified freight spaces. Thus, curved configuration ceiling panels required for an indirect cabin illumination of passenger spaces on the upper deck, cannot be used on the lower deck to the extent required for a sufficient indirect illumination of the entire cabin space on the lower deck. The required curvature of the ceiling for the intended indirect illumination is also hampered by the fact that system installations in the floor of the upper deck that forms the ceiling for the lower deck militate against such curvatures having due regard to the limited floor-to-ceiling clearance on the lower deck.

OBJECTS OF THE INVENTION

In view of the above it is the aim of the invention to achieve the following objects singly or in combination:

- to provide a passenger comfort and illuminating unit which does not rely on a curved ceiling for achieving an adequate indirect illumination of a lower deck passenger space particularly on the lower deck of a passenger aircraft;
- to combine passenger convenience elements including passenger comfort elements with illuminating or light emitting devices in a functional unit that can itself be used as a wall panel, or can be attached to a flat wall or ceiling panel particularly in a passenger space on the lower deck of an aircraft;
- to assure an adequate illumination of the cabin space even along the floor of such a space; and
- to combine in a compact unit different elements for performing several functions relevant to all passengers and functions relevant to individual passengers.

SUMMARY OF THE INVENTION

The above objects have been achieved according to the invention by a comfort and illumination apparatus or function unit for a passenger space or cabin, wherein the unit is characterized by a flat or plane mounting base, for example in the form of a molded or die stamped flat or plane base plate, which forms an elongated column for integration into a flat wall enclosing the passenger space. Passenger convenience elements are mounted on the flat or plane mounting base to face at least partly into the passenger space and light emitting illuminating means are also secured to the elongated. column to complete the column for an overall illumination of the cabin space. Preferably, the illuminating means are arranged to form a frame at least partly around the other passenger convenience elements.

The term "passenger convenience elements" as used herein is intended to include comfort elements, display elements, safety elements, passenger operable elements, information elements, and communication elements. Comfort elements could include, for example, but not exclusively, earphones for listening to music. Display elements could, for example include signs that a toilet is occupied or not occupied that the passenger should return to the assigned seat or the like. Safety elements could include, for example oxygen boxes and respective oxygen masks as well as safety handles such as a railing. Passenger operable elements could include, for example volume adjustment and selector switches. Information elements could, for example include illuminated instructions or labels. Communication elements could, for example, include loudspeakers and microphones for a public address system including an intercom system.

It is a particular advantage of the invention that the construction of the function unit as a flat arrangement makes it suitable for passenger spaces having a relatively small floor-to-ceiling clearance and flat enclosure walls while simultaneously assuring a sufficient overall illumination of the passenger space, such as a waiting room in front of several toilets on the lower floor or deck of an aircraft. By combining several service comfort and safety functions in the present unit while maintaining a compact structure, it is possible to arrange these features in a clearly organized manner that can be quickly grasped by a passenger, for example on the way to the restroom or lavatory. The present function units are constructed with due regard to ergonomic requirements. The construction is especially suitable for integration into flat wall panels of a passenger cabin particularly in spaces or rooms used by passengers on the lower deck of the aircraft. The present panels are also suitable for integration into a flat ceiling as well as vertical flat walls of a cabin, sleeping area, or lavatory area or the like.

According to the invention there is also provided a passenger space equipped with function units according to the invention in the form of wall and/or ceiling panels, whereby the arrangement is such that a good overall illumination is realized for the required overall lighting requirements without the need for curved ceiling cover panels. Moreover, the present units are easily recognized by the passenger due to the functional arrangement of the displays and other passenger convenience elements.

Another advantage of the invention is seen in that in addition to the overall illumination of a passenger space an adequate illumination near the floor area is achieved in the passenger space, particularly also for emergency lighting purposes.

By arranging safety handlebars in a vertical orientation along the lower end of the present function units or columns, a passenger who may have fallen to the floor due to an air turbulence, can easily reach such a vertically arranged handlebar. Moreover, by positioning the function elements at the proper elevation in the present function column all operating elements, comfort elements and safety elements are within an easily accessible or easily visible range for a passenger.

Where the present function unit is integrated into a passenger cabin wall, particularly next to a passenger seat on the lower floor or deck, individual comfort elements such as earphones may be emphasized in such a panel embodiment as compared to elements more suitable for the general comfort of all passengers, such as loudspeakers.

By integrating the present unit into a flat sidewall or a flat ceiling of a passenger space and providing the respective covers, the unit is protected against unpermissible interference by passengers while simultaneously permitting an easy connection of the back side of the unit or column to aircraft supply components such as air conditioning ducts, electrical conductors and the like.

Yet another advantage of the invention is seen in that it is well adaptable to particular requirements as a wall panel in generally accessible passenger areas or spaces and for use next to a passenger seat or row of seats, whereby passenger specific elements or components may be combined with cabin specific components.

BRIEF DESCRIPTION OF THE DRAWINGS

In order that the invention may be clearly understood, it will now be described in connection with example embodiments, with reference to the accompanying drawings, wherein:

FIG. 6 is a perspective view of a wall panel according to the invention attached to a flat wall between two sleeping areas showing several bunkbeds.

DETAILED DESCRIPTION OF PREFERRED EXAMPLE EMBODIMENTS AND OF THE BEST MODE OF THE INVENTION

Figure 1:
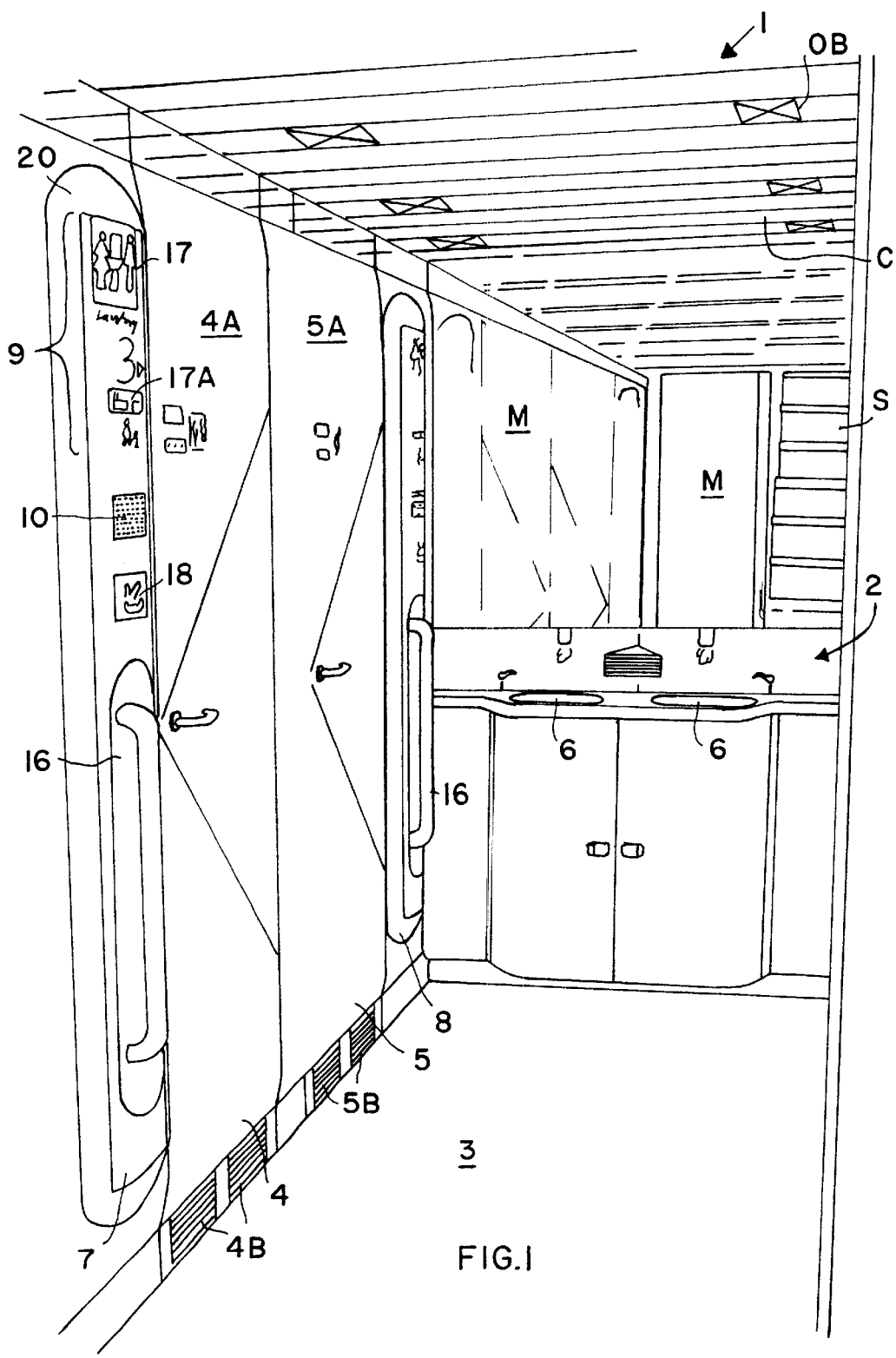
FIG. 1 shows a perspective view of a passenger space on the lower deck of an aircraft in front of a lavatory and several separate toilets.

FIG. 1 shows a perspective view of a passenger space 1 on the lower deck of a passenger aircraft. The space 1 is enclosed by flat walls to contain a lavatory 2, a waiting area or aisle 3 in front of the lavatory 2 and in front of toilets 4 and 5 closed by respective doors 4A and 5A. Each door is provided with at least one vent grill 4B, 5B. The lavatory 2 holds, for example two washbasins 6, wall mirrors M and storage shelves S. A straight or flat ceiling C closes the passenger space 1 above the lavatory 2 and above the waiting area or aisle 3. The straight ceiling C may be provided with safety devices such as oxygen boxes OB with respective oxygen masks concealed in the boxes. In passenger aircraft especially long distance passenger aircraft, such lavatory and toilet facilities are normally positioned on the lower deck where the clearance between the floor of the aisle 3 and the ceiling 3 is limited, for example 196 cm, whereby it is not possible to enclose the ceiling C with curved ceiling panels. Accordingly, it is also not possible to mount the illuminating devices such as fluorescent bulbs in the ceiling for lack of space for providing an adequate overall illumination of the lavatory 2 and the waiting area or aisle 3. The waiting area or aisle 3 provides access to several toilets, only two of which are shown.

In order to solve the just stated problem of adequately illuminating passenger spaces having a limited floor-to-ceiling clearance, functional units or columns 7, 8 that may be attached to wall panels or that may be used as a wall panel are mounted next to the toilet doors 4 and 5. The embodiments of the functional units 7 and 8 are specifically constructed for mounting in a lavatory toilet waiting area. Thus, the unit 7 is arranged next to the toilet door 4A and the unit 8 is positioned alongside the toilet door 5A. Both units provide an adequate common illumination of the aisle 3 and of the lavatory 2. In addition to the common illumination function the units 7 and 8 provide safety and comfort functions for the passengers. Each unit 7 and 8 is constructed as an elongated column that may form a narrowwall panel section. Each unit is provided, for example with an information group 9 of elements such as a display element 17 providing information regarding the occupied or unoccupied status of the respective toilet. The units 7, 8 further comprise a loudspeaker 10 and an ashtray 18 with an indication that a cigarette must be extinguished before entering a toilet. The units 7 and 8 are further equipped with a safety device in the form of a vertically mounted handrail 16, the lower end of which is close to the floor in case a passenger fell to the floor because of an air disturbance. Other optical information devices, such as a display or indicator 17A, may be provided as part of information group 9, for example that the passengers should return to his or her seat or to inform the passenger about the occupancy status of other toilets. Other optical informations may be provided depending on the particular location of the functional unit 7 or 8 as will be described below.

Figure 2:
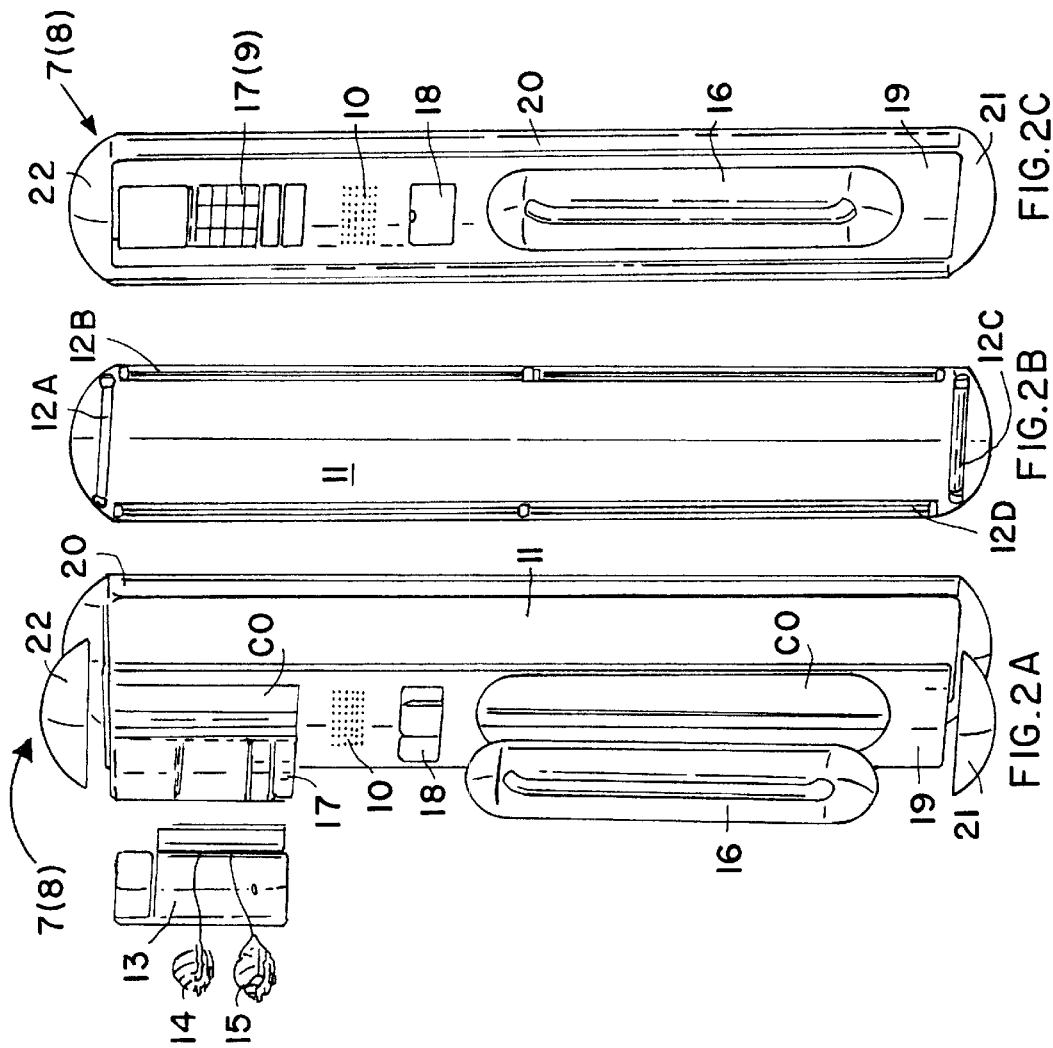
FIG. 2A shows an exploded view of the present function unit prior to assembly of the individual convenience elements to a mounting base.
FIG. 2B shows the mounting base having secured thereto fluorescent bulbs forming a frame around the base.
FIG. 2C shows the assembled function unit or column according to the invention for integration into a paneled wall.

Structural details of the functional units 7 or 8 will now be described with reference to FIGS. 2A, 2B and 2C. FIG. 2B shows a mounting base 11 forming an elongated column for integration into a wall enclosing a passenger space, for example in an aircraft. The base 11 will be described in more detail below with reference to FIG. 3. As shown in FIG. 2B the mounting base 11 carries four light sources, preferably elongated fluorescent tubes 12A, 12B, 12C and 12D which preferably form an illuminating frame all around the base 11 or at least partly around the base 11 by, for example, omitting the top tube 12A.

Figure 3:
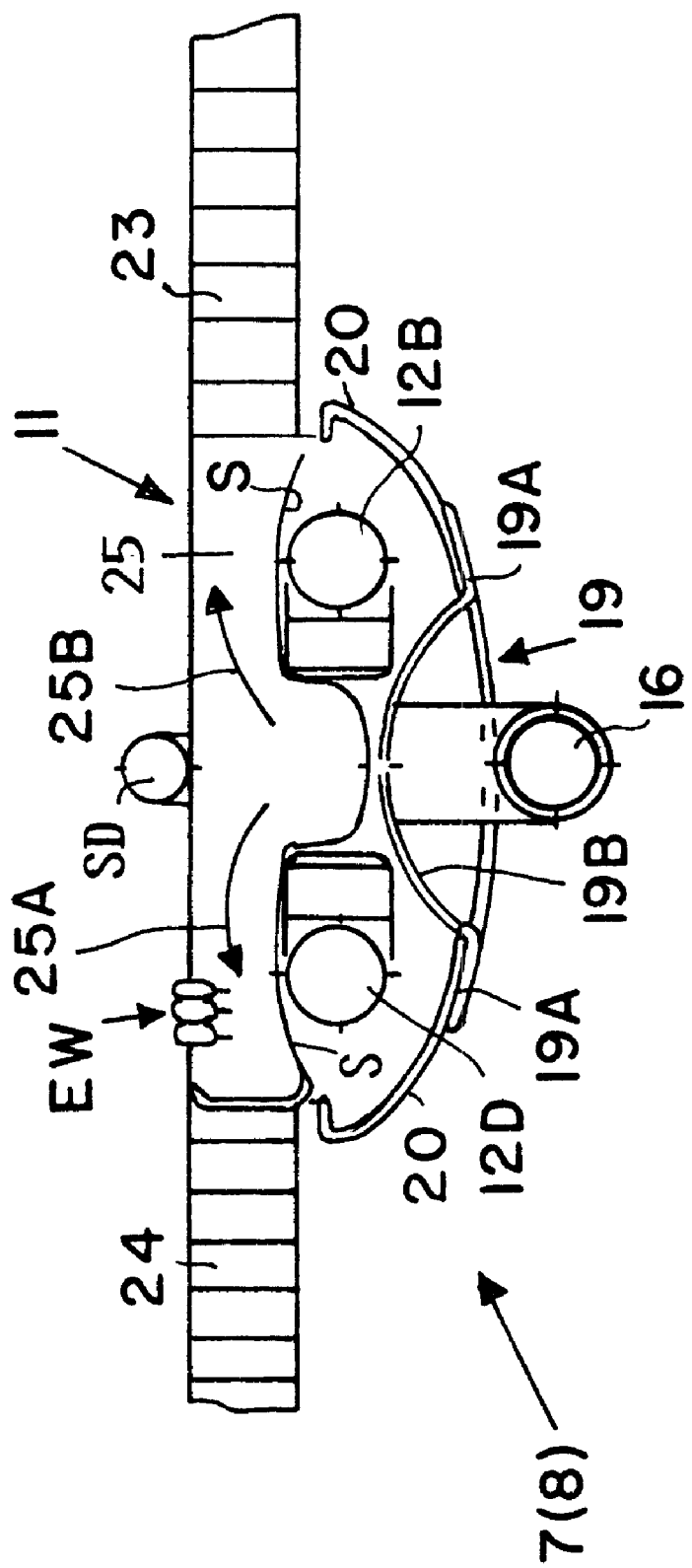
FIG. 3 illustrates a sectional view through the present unit or column installed or integrated into a wall between two wall panels, whereby the section is taken along section line III—III in FIG. 4.

As shown in FIGS. 2A, 2B and 2C the units 7 and 8 are constructed and assembled to form a column. The mounting base 11 carries on its surface facing into the passenger space or aisle 3 various passenger convenience elements while the mounting base 11 itself can be secured to or become part of a wall panel. Alternatively, the base 11 may be dished for assembly between two wall panels 23 and 24 as shown in FIG. 3. The column arrangement permits a preferred embodiment of the units 7 and 8 to extend from the floor level to the ceiling level, whereby the mounting base 11 functions as a carrier for all elements integrated into the column. As mentioned, the fluorescent tubes 12A, 12B, 12C and 12D form a frame around the other elements that are secured to the base 11 and form part of the column. These elements may include an oxygen box 13 for supplying oxygen to oxygen masks 14 and 15 as well as a vertically arranged hand rail 16, an ashtray 18, a loudspeaker 10 and indication and the information group 9 with elements 17 and 17A.

The vertical arrangement of the fluorescent tubes 12B and 12D so that they extend substantially over the entire floor-to-ceiling clearance makes it possible to efficiently use the available relatively short clearance in order to provide the required light quantity or illumination for the aisle 3 and the lavatory 2. Particularly, the light emission near the floor is enhanced by a fluorescent tube 12C, whereby an adequate floor illumination in the aisle 3 and lavatory 2 is assured.

Figure 4:
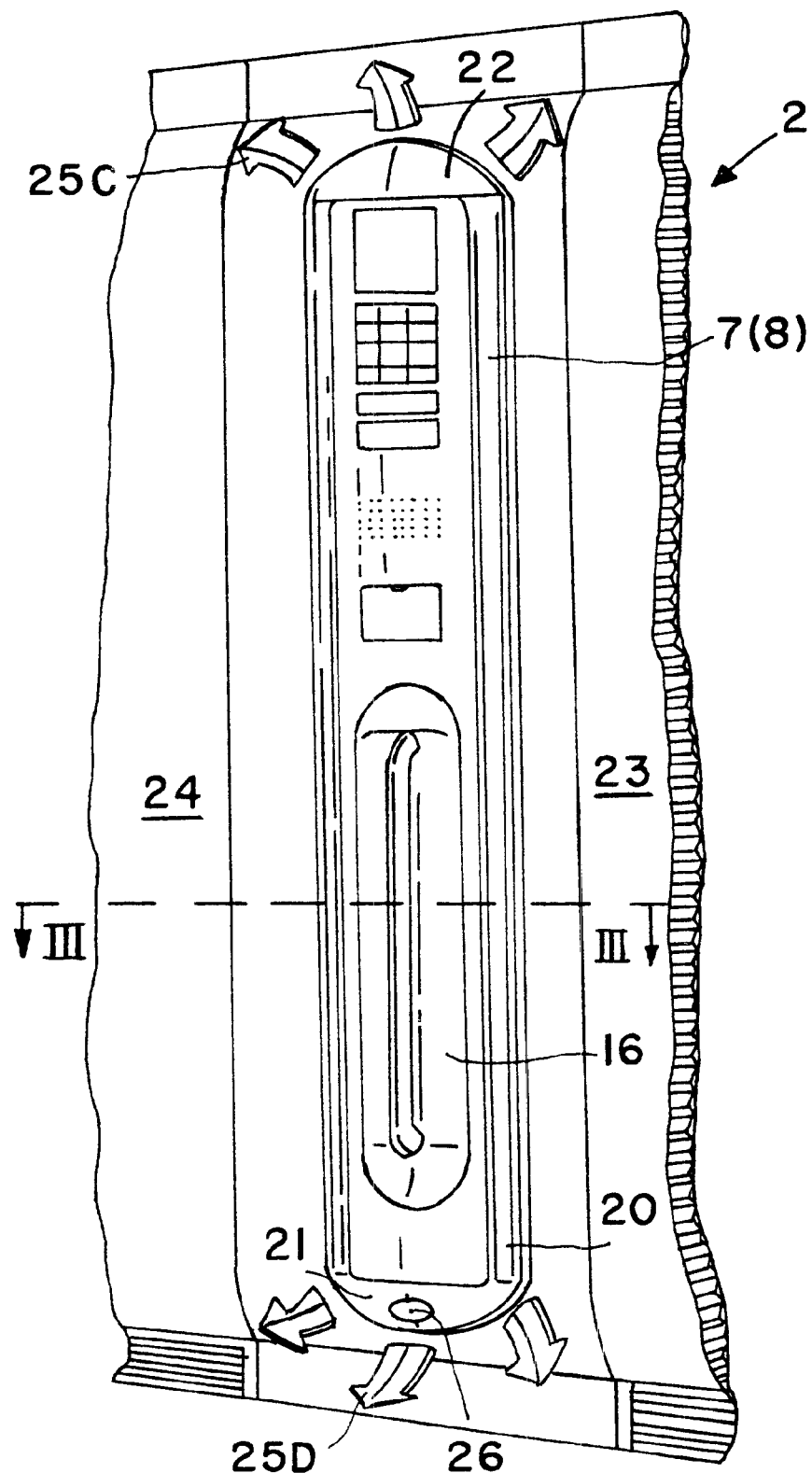
FIG. 4 shows a perspective view of the present function unit integrated into a vertical wall of a passenger space in an aircraft showing an air flow distribution.

The illumination of the floor is also assured, as shown in FIG. 4 during an emergency as long as there is emergency battery power available for an emergency lighting device 26 positioned at the lower column end. Thus, a separate arrangement of conventional emergency lighting devices is avoided. The electrical supply lines for the individual components of the columns 7, 8, particularly for the fluorescent tubes and the emergency lighting 26 are connected through the back of the base 11 to a central power supply. Thus, the required length of electrical power supply lines is minimized and the connections are easily. accessible by opening the column.

It depends on the particular type of use which individual elements are integrated into the function units 7 or 8. In any of these embodiments the integration of all the function elements in a common unit results in an organized overall picture of the passenger space combined with a greatly facilitated maintenance work since the individual elements are easily accessible in the column by merely removing a cover plate 19 and, if necessary a cover frame 20.

The fluorescent tubes 12A, 12B, 12C and 12D which form a frame around the column or other illuminating devices such as luminescent light sources secured to the mounting base 11 are covered by the above mentioned frame 20 which is preferably made of light transparent material, preferably translucent material. The frame 20 protects the light sources. Additionally to the frame 20 partial cover elements 21, 22 may be arranged at the top and bottom of the mounting base 11 so that, for example, the horizontally extending shorter fluorescent tubes 12A and 12C are separately covered by the cover elements 21 and 22 which are also transparent or translucent. Furthermore, the cover plate 19 is positioned as best seen in FIG. 3. The cover plate 19 has edges or rims 19A that overlap the cover frame 20. The cover plate 19 is further provided with a recess or trough 19B to facilitate the accessibility to the vertically extending handrail 16. The cover plate 19 is provided with cut-outs or recesses CO in which the convenience elements that require visibility or access by a passenger, are received. Maintenance work or replacement work is facilitated by simply removing the cover plate 19 and, if necessary, the cover frame 20 and/or the partial covers 21 and 22 for cleaning, maintenance and exchange.

FIG. 2C shows the function unit 7 or 8 as a complete unit. In the lower portion of the column or function unit 7 and 8 the handrail 16 is reaching almost to the floor for the purpose of enabling a person who has fallen to the floor to hold onto the handrail 16, whereby getting up is facilitated. The handrail 16 is also suitable for children to hold onto when there should occur an air disturbance through which the aircraft is flying. Additional safety handrails or grips that extend horizontally may also be provided, for example at the level of door handles.

Referring further to FIG. 2C an ashtray 18 is positioned just above the upper end of the vertical rail 16. The ashtray is preferably combined with a display or pictogram "no smoking" for indicating to the passengers that smoking in the lavatory area is not permitted and that any cigarettes must be extinguished in the ashtray. A loudspeaker 10 is arranged above the ashtray. The loudspeaker is part of a central public address system so that general informations may be disseminated in the passenger spaces also on the lower deck. An oxygen box 13 with respective oxygen masks 14 and 15 is arranged behind the cover plate 19, whereby the masks are accessible through respective cut-outs that may be covered by flaps that open automatically in response to a pressure drop in the aircraft so that the masks can fall down. It is conceivable that the number of passengers in the waiting area 3 exceeds the number of oxygen masks provided by the columns 7 and 8. Therefore, additional oxygen boxes OB and respective oxygen masks are provided in the flat ceiling as shown in FIG. 1. Where the ceiling can hold a sufficient number of oxygen masks for the particular area, it may not be necessary to equip the columns 7, 8 with oxygen supply devices 13, 14 and 15.

The above mentioned information group 9 preferably is arranged with its elements 17, 17A in the upper area of the function columns 7 or 8 near the cover flaps for the oxygen boxes 13, whereby different types of information displays preferably form part of the information groups 9. These displays are preferably illuminated indirectly or passively by the light emanating from the light sources such as the fluorescent bulbs. The type of optical information displaying devices to be integrated into the columns will depend on the particular location in the aircraft intended for the column. Thus, for example, columns 7, 8 constructed for use as shown in FIG. 1 in a lavatory waiting area will include the number of the respective toilets and an arrow pointing to the corresponding toilet door as well as indications whether the toilet is occupied or unoccupied, or whether it may be used at all. Further types of function columns will be described in greater detail below with reference to FIGS. 5 and 6.

FIG. 3 shows a cross-section through the function unit or column 7 or 8, whereby the horizontal section shows the configuration of the mounting base 11 positioned between two wall panels 23 and 24, the base 11 is molded or die stamped to form an air duct 25 which receives fresh air from a supply duct SD. The duct 25 is so shaped that the air is laterally distributed as shown by the arrows 25A and 25B. Since the function units are so shaped that they fit between two wall panels 23 and 24 the function unit 7, 8 may themselves be considered to be special wall panels or even straight ceiling panels. However, it is also possible to attach the present function units onto a wall or ceiling panel which would have to be provided with the respective access openings for an air duct and for the required electrical supply wires. Electrical wiring EW enters directly into the space formed by the mounting base 11 as shown in FIG. 3.

As mentioned above, the cover frame 20 is light transparent, preferably translucent. However, the cover plate 19 is opaque. It is preferred that the inwardly facing surface of the cover plate 19 particularly the trough area 19B has a smooth surface having reflection characteristics so that the light reflection is enhanced. The primary light reflection is provided by the outwardly facing surface S of the mounting base 11. The surfaces of the fluorescent bulb mounts facing the bulb are preferably also light reflecting. The curvature of the trough 19B facing into the space enclosed by the cover 19 facilitates the reflection of the light back to the surface S and then out through the transparent cover frame 20, particularly for the fluorescent bulb 12B and 12D. The cover plate 19 may be formed of any suitable material such as aluminum or stainless steel sheet material. The outer surface has preferably a brushed finish while the inner surface is light reflecting as mentioned.

The function of the mounting base 11 as an air distribution device is facilitated by its easy connection to the air supply duct SD forming part of the air conditioning system of the passenger conveyance such as an aircraft or train. In this connection it is possible to connect the supply ducts SD directly to air outlets shown by arrows 25C and 25D in FIG. 4 or to form the backside of the mounting base 11 itself as an air duct as mentioned above. The latter embodiment is preferred since it reduces the length of required ducts or pipelines while obtaining a multiple use of the mounting base 11 as a mounting device and as an air duct section. Another advantage is seen that the air outlets designated by the arrows 25C and 25D are positionable exactly where needed, namely near the floor as shown at 25D in FIG. 4 or near the ceiling as shown at 25C in FIG. 4. The outlets may be so configured that the desired flow direction is achieved as indicated by the arrows 25D and 25C. The arrows 25A and 25B indicate the flow direction inside the space enclosed by the back side of the mounting base 11. The air outlets may, for example, be formed by slots in the end cover sections 21 and 22.

For ventilating purposes, air suction may also be applied to the air outlets 25C and 25D. Alternatively, suction may be applied at 25D while air blowing is applied at 25C or vice versa. FIG. 4, further shows that an emergency lighting unit 26 is provided near the floor either in the separate partial cover section 21 or in the frame section 20.

Figure 5:
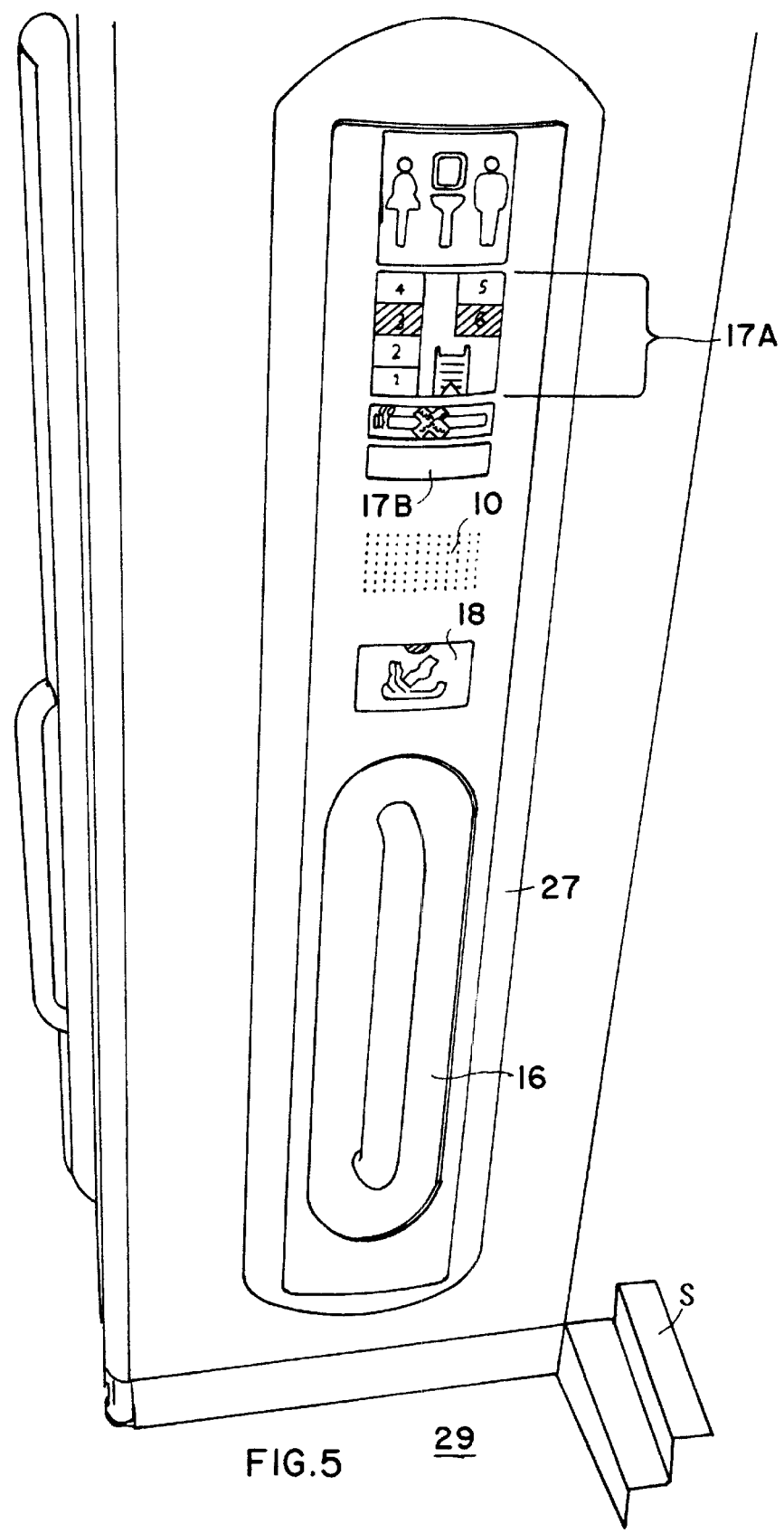
FIG. 5 is a perspective view of a function unit according to the invention integrated into a wall panel in the waiting area in front of a lavatory toilet area.

FIG. 5 shows a further embodiment of a function unit 27 according to the invention constructed for use in connection with a plurality of toilets. Thus, the unit 27 is positioned where it is prominently visible next to the lower landing 29 of stairs S that connect the upper deck to the lower deck. For this purpose the unit 27 is equipped with a special display 17A showing a total of six toilets, number 3 and 6 of which are indicated to be occupied. The special display 17B is preferably connected to a central purser station, whereby a flight attendant may provide information, for example which toilet is totally defective and may not be used at all.

FIG. 6 shows a sleeping area 30 on the lower deck LD showing sleeping compartments with several bunkbeds 31, 32, 33 and 34 that may be used either by the crew or by passengers. The function unit 28 is prominently positioned at an entrance to the sleeping compartments. The special display 17B is constructed to show which of the bunkbeds are available and which are occupied, the particular position of the bunkbed that is occupied or free may also be shown on the display 17B in the form of a layout or map so that access can be provided with a minimum of disturbance to other passengers already occupying a bunkbed. Further, an intercom between the cockpit and/or a purser station and the sleeping area individually for each bunkbed may be individually provided, for example, to have immediate access to crew members who have a rest period.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A comfort and illumination apparatus for a passenger space, comprising a flat mounting base forming an elongated column adapted for cooperation with a flat vertical wall enclosing said passenger space, passenger convenience elements mounted on said flat mounting base to face at least partly into said passenger space, means for an overall illuminating of said passenger space, said means for illuminating being mounted to said flat mounting base at least in a vertical position to form at least part of said elongated column.

2. The apparatus of claim 1, wherein said passenger convenience elements comprise comfort elements, display elements and safety elements, and wherein said means for said overall illuminating of said passenger space simultaneously illuminate at least one of said passenger convenience elements.

3. The apparatus of claim 1, wherein said passenger convenience elements comprise safety elements including at least an oxygen box (13) and an oxygen mask connected to said oxygen box.

4. The apparatus of claim 3, wherein said safety elements further comprise at least one vertical safety handle.

5. The apparatus of claim 4, wherein said at least one safety handle extends vertically along said flat mounting base forming a column.

6. The apparatus of claim 1, wherein said flat mounting base is an elongated configured component to which said passenger convenience elements are attached.

7. The apparatus of claim 1, wherein said means for said overall illuminating of said passenger space are elongated fluorescent lamps forming at least a partial illuminating frame positioned vertically along an edge zone of said flat mounting base, said apparatus further comprising at least one cover frame (20, 21, 22) which is at least partly light transparent for at least partly covering said illuminating frame.

8. The apparatus of claim 1, further comprising a cover (19) for at least partly covering said passenger convenience elements, and cut-outs in said cover (19) for making at least certain of said passenger convenience elements passenger accessible manually, audibly or visually.

9. The apparatus of claim 8, wherein said cover (19) comprises a reflecting surface facing inwardly toward said flat mounting base.

10. The apparatus of claim 9, wherein said reflecting surface is a light reflecting surface.

11. The apparatus of claim 1, wherein said illuminating means comprise at least one emergency light (26) positioned at a lower end of said elongated column for illuminating a floor of said passenger space.

12. The apparatus of claim 1, further comprising at least one air inlet connectable to an air conditioning system, at least one air outlet for releasing air into said passenger space and an air duct connecting said air inlet and said air outlet.

13. The apparatus of claim 12, wherein said flat mounting base is formed or molded to comprise said air duct (25).

14. The apparatus of claim 1, wherein said passenger convenience elements are selected from the group consisting of comfort elements, display elements, safety elements, passenger operable elements, and communication elements.

15. A passenger space comprising flat wall panels covering straight flat walls of said passenger space, at least one of said flat wall panels comprising a comfort and illumination apparatus including a flat mounting base forming an elongated column adapted for integration into a flat wall enclosing said passenger space, passenger convenience elements mounted on said flat mounting base to face at least partly into said passenger space, and means for an overall illuminating of said passenger space, said means for illuminating being mounted to said flat mounting base forming said column.

16. The passenger space of claim 15, wherein said flat straight walls enclose said passenger space in a lower deck of a passenger aircraft, said passenger space having a low vertical height withing the range of 6 to 7 feet (180 to 210 cm).

17. The passenger space of claim 15, wherein said flat straight walls are vertical side walls of said passenger space, whereby said comfort and illumination apparatus is incorporated in said vertical side walls.

18. The passenger space of claim 15, wherein said flat straight walls are horizontal flat ceiling wall panels, said passenger space comprising additional safety elements (OB) installed in said flat ceiling wall panels.

19. The passenger space of claim 18, wherein said additional safety elements comprise oxygen boxes (OB) and respective oxygen masks that drop from said ceiling wall panels.

* * * * *